US011433913B2

(12) United States Patent
Iozumi et al.

(10) Patent No.: US 11,433,913 B2
(45) Date of Patent: Sep. 6, 2022

(54) FAILURE DETERMINING DEVICE, AND FAILURE DETERMINATION DATA ACQUIRING DEVICE (71) Applicant: Isuzu Motors Limited, Shinagawa (JP)

(72) Inventors: Manabu Iozumi, Fujisawa (JP); Katsushi Shidomi, Fujisawa (JP)

(73) Assignee: Isuzu Motors Lämskted, Tokyo (JP)

( * ) Notice: Subject to any disclaimer, the term of this patent is extended or adjusted under 35 U.S.C. 154(b) by 0 days.

(21) Appl. No.: 17/040,364

(22) PCT Filed: Mar. 20, 2019

(86) PCT No.: PCT/JP2019/011761
§ 371 (c)(1),
(2) Date: Sep. 22, 2020

(87) PCT Pub. No.: WO2019/182026
PCT Pub. Date: Sep. 26, 2019

(65) Prior Publication Data
US 2021/0053576 A1 Feb. 25, 2021

(30) Foreign Application Priority Data
Mar. 22, 2018 (JP) .............................. JP2018-054328

(51) Int. Cl.
*F01N 3/023* (2006.01)
*B60W 50/02* (2012.01)
(52) U.S. Cl.
CPC .... *B60W 50/0205* (2013.01); *B60W 50/0225* (2013.01); *F01N 3/023* (2013.01); *B60W 2050/021* (2013.01)

(58) Field of Classification Search
CPC .................................................. B60W 50/0205
See application file for complete search history.

(56) References Cited

U.S. PATENT DOCUMENTS

2009/0055079 A1    2/2009  Tanaka
2019/0235954 A1*   8/2019  Gim ..................... G06F 11/1048

FOREIGN PATENT DOCUMENTS

| ES | 2294422 T3 * | 4/2008 | ............. B60K 6/365 |
| JP | H06081747 A | 3/1994 | |
| JP | 2001329894 A * | 11/2001 | |
| JP | 2001329894 A | 11/2001 | |
| JP | 2009047112 A | 3/2009 | |

(Continued)

OTHER PUBLICATIONS

International Search Report for International Application No. PCT/JP2019/011761; dated Jun. 4, 2019.

*Primary Examiner* — Shelley Chen (57) ABSTRACT

This failure determining device is provided with a first determining unit which refers to correction amount data indicating a correction amount relating to operation of a part related to an internal combustion engine, to determine whether there is a possibility that the internal combustion engine has failed, a data acquiring unit which, if it has been determined that there is a possibility that the internal combustion engine has failed, acquires influencing factor data indicating a factor influencing the correction amount, and a second determining unit which refers to the correction amount data together with the acquired influencing factor data to determine whether the internal combustion engine has failed.

8 Claims, 6 Drawing Sheets

(56) References Cited

FOREIGN PATENT DOCUMENTS

| JP | 2016098798 A | | 5/2016 | | |
|----|--------------|---|--------|---|---|
| JP | 2017025761 A | | 2/2017 | | |
| JP | 2018021506 A | * | 2/2018 | ............ | F02D 29/02 |
| JP | 2018021506 A | | 2/2018 | | |
| WO | WO-2018025763 A1 | * | 2/2018 | ............ | F02D 29/02 |

* cited by examiner

FAILURE DETERMINING DEVICE, AND FAILURE DETERMINATION DATA ACQUIRING DEVICE

CROSS REFERENCE TO RELATED APPLICATIONS

This is the U.S. national stage of application No. PCT/JP2019/011761, filed Mar. 20, 2019. Priority under 35 U.S.C. § 119(a) and 35 U.S.C. § 365(b) is claimed from Japanese Patent Application No. 2018-054328, filed on Mar. 22, 2018, the disclosure of which is also incorporated herein by reference.

TECHNICAL FIELD

The present disclosure relates to a failure determining device, and a failure determination data acquiring device.

BACKGROUND ART

Conventionally, it is known that in an internal combustion engine of a vehicle, operation of a portion related to the internal combustion engine is corrected. For example, Patent Literature (hereinafter, referred to as "PTL") 1 discloses a technique of correcting a fuel injection amount in each cylinder of an internal combustion engine including a plurality of cylinders so as to restrain a variation between the cylinders.

In such a technique, it is generally known that a limit value is set for a correction amount in the operation of the portion described above so as to prevent excessive correction. When the number of times when the correction amount described above reaches the limit value increases, it is considered that a failure has occurred in the internal combustion engine so that components are replaced, or the like.

CITATION LIST

Patent Literature

PTL 1
Japanese Patent Application Laid-Open No. 2017-25761

SUMMARY OF INVENTION

Technical Problem

However, the correction amount described above may increase due to a factor other than a failure of the internal combustion engine. Accordingly, when it is determined only based on an increase in the correction amount that a failure has occurred in the internal combustion engine, normal components may be replaced or a vehicle in which no failure occurs may be taken in for repair. Accordingly, further improvement in accuracy of failure determination of the internal combustion engine is desired.

An object of the present disclosure is to provide a failure determining device and a failure determination data acquiring device capable of improving accuracy of failure determination of an internal combustion engine.

Solution to Problem

A failure determining device according to the present disclosure includes:

a first determining section that determines whether there is a possibility that the internal combustion engine has failed with reference to correction amount data indicating a correction amount in operation of a portion related to an internal combustion engine;

a data acquiring section that, in a case where it is determined that there is the possibility that the internal combustion engine has failed, acquires influencing factor data indicating a factor influencing the correction amount; and a second determining section that determines whether the internal combustion engine has failed with reference to the correction amount data together with the acquired influencing factor data.

A failure determination data acquiring device according to the present disclosure includes:

a first determining section that determines whether there is a possibility that the internal combustion engine has failed with reference to correction amount data indicating a correction amount in operation of a portion related to an internal combustion engine;

a data acquiring section that, in a case where it is determined that there is the possibility that the internal combustion engine has failed, acquires influencing factor data indicating a factor influencing the correction amount; and a data processing section that internally stores and/or externally transmits the correction amount data and the acquired influencing factor data in association with each other, for determining whether the internal combustion engine has failed.

Advantageous Effects of Invention

According to the present disclosure, it is possible to improve accuracy of failure determination of an internal combustion engine.

DESCRIPTION OF EMBODIMENTS

Figure 1:
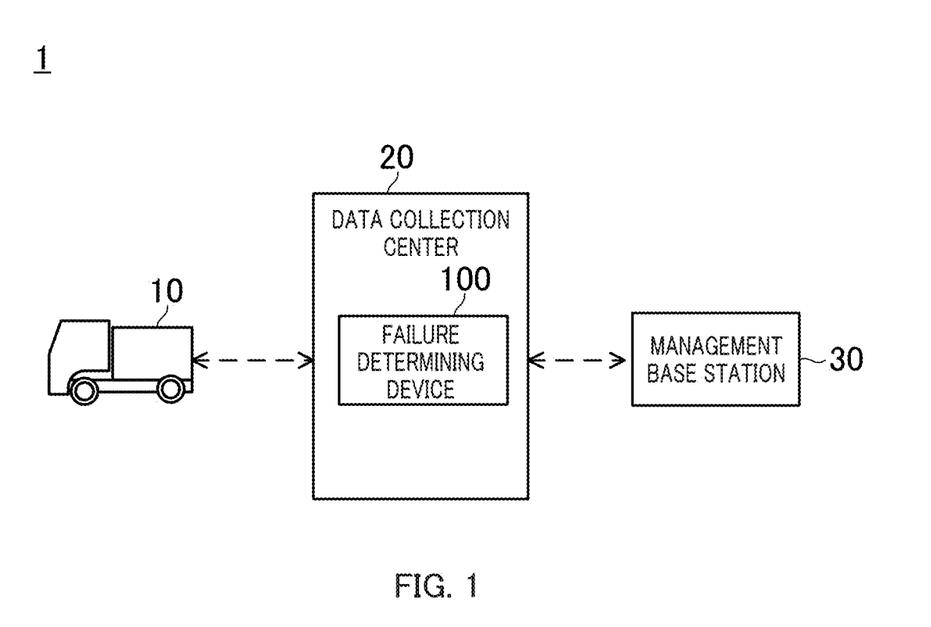
FIG. 1 illustrates a failure determination system according to an embodiment of the present disclosure.

Hereinafter, an embodiment of the present disclosure will be described in detail with reference to the accompanying drawings. FIG. 1 illustrates failure determination system 1 according to an embodiment of the present disclosure.

As illustrated in FIG. 1, failure determination system 1 is a system in which vehicle 10, and failure determining device 100 in data collection center 20 cooperatively determine a failure of internal combustion engine 11 (see FIG. 2) of vehicle 10. Failure determining device 100 is a device that determines a failure of internal combustion engine 11 of vehicle 10, and is provided in data collection center 20 that collects data indicating the state of internal combustion engine 11 of vehicle 10.

Failure determining device 100 is connected to vehicle 10 via a radio communication line, and receives the data indicating the state of internal combustion engine 11 of vehicle 10 from vehicle 10 at predetermined time intervals. Further, failure determining device 100 is connected to management base station 30 that manages vehicle 10 via a network such as an electric communication line.

When management base station 30 receives a notification from failure determining device 100 to the effect that a failure has occurred in internal combustion engine 11 of vehicle 10, the driver is notified to the effect that a failure has occurred in internal combustion engine 11 or a notification indicating attention calling for replacement of components of vehicle 10 or the like is performed to the driver.

Figure 2:
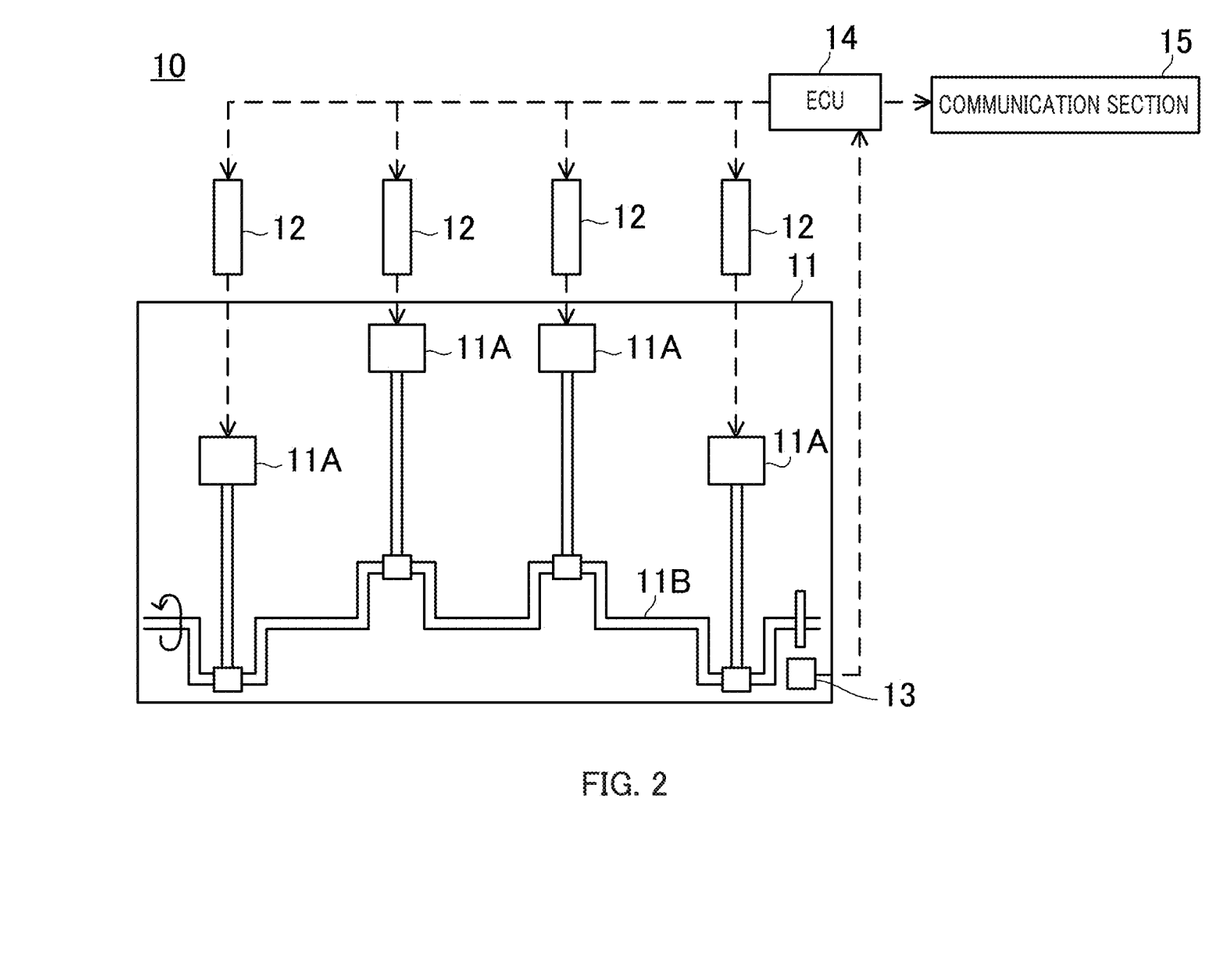
FIG. 2 illustrates a part of a configuration of an internal combustion engine of a vehicle.

Next, a part of a configuration of internal combustion engine 11 of vehicle 10 will be described. FIG. 2 illustrates the part of the configuration of internal combustion engine 11.

As illustrated in FIG. 2, vehicle 10 includes internal combustion engine 11, injectors 12, angular velocity detecting section 13, electronic control unit (ECU) 14, and communication section 15.

Internal combustion engine 11 is, for example, a diesel engine, and includes four cylinders 11A and crankshaft 11B. Each of four cylinders 11A is provided in crankshaft 11B that is rotatable.

Injectors 12 are provided corresponding to four cylinders 11A, respectively, and inject fuel into each cylinder 11A.

Angular velocity detecting section 13 detects angular velocities of each cylinder 11A, and outputs the detected angular velocities to ECU 14.

ECU 14 is an electronic control unit, and includes a central processing unit (CPU), a read only memory (ROM), a random access memory (RAM), and an input/output circuit, all of which are not illustrated. ECU 14 corrects a variation in operation of each cylinder 11A based on a program set in advance.

Specifically, ECU 14 calculates an average value of the angular velocities of each cylinder 11A based on detection results of angular velocity detecting section 13, and corrects fuel injection amounts of each injector 12 such that the angular velocities of each cylinder 11A become the average value.

For example, in a case where the angular velocity of one cylinder 11A is smaller than the average value, ECU 14 increases the fuel injection amount of injector 12 such that the angular velocity of cylinder 11A mentioned above becomes the average value. Further, in a case where the angular velocity of one cylinder 11A is larger than the average value, ECU 14 reduces the fuel injection amount of injector 12 such that the angular velocity of cylinder 11A mentioned above becomes the average value.

ECU 14 performs the above-described operation correction each time a variation in operation of cylinder 11A described above occurs. That is, the aforementioned operation correction is performed a plurality of times in accordance with the occurrences of variations in operation. ECU 14 outputs correction amount data, which indicate, in time series, correction amounts in the operation corrections of cylinder 11A for the plurality of times, to communication section 15. Further, ECU 14 outputs time-series data, which indicate, in time series, the state of internal combustion engine 11, to communication section 15 in a case where there is a request from failure determining device 100.

The time-series data indicating the state of internal combustion engine 11 include the correction amount data, and influencing factor data such as data relating to the temperature in cylinder 11A, data relating to the temperature of the fuel, and data relating to execution of regeneration processing for a diesel particulate filter in an exhaust pipe. The influencing factor data are, as will be described later, data that become a factor influencing the correction amount, and that correspond to the operation correction to be performed.

Figure 3:
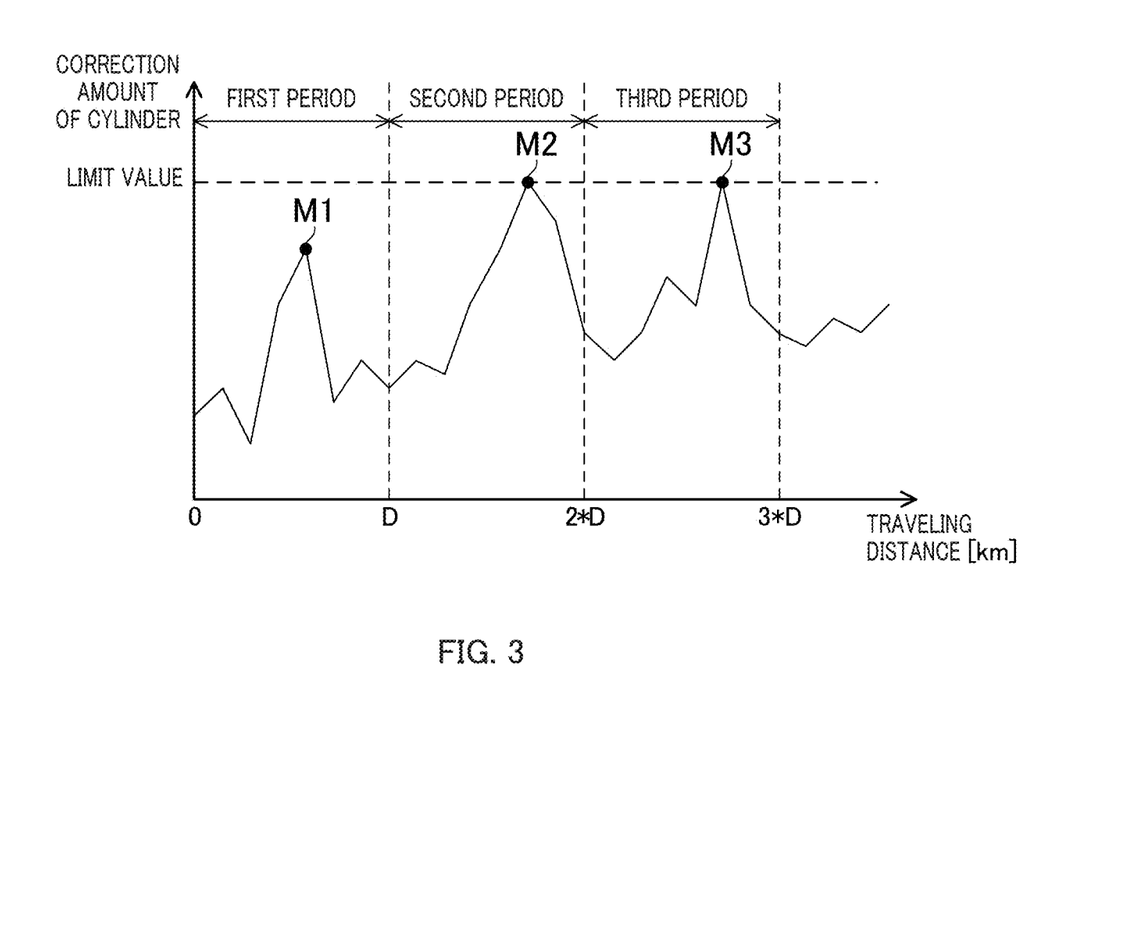
FIG. 3 illustrates a relationship between a traveling distance of the vehicle and a correction amount of a cylinder.

Communication section 15 transmits, among the correction amount data, a maximum value of a correction amount within a period during which vehicle 10 travels a predetermined distance to data collection center 20 (failure determining device 100) for each of periods. FIG. 3 illustrates a relationship between a traveling distance of vehicle 10 and a correction amount of cylinder 11A.

Communication section 15 transmits maximum values M1, M2, and M3 of correction amounts in periods during each of which vehicle 10 travels D km as illustrated in FIG. 3, for example, to data collection center 20. D is a value that can be arbitrarily set.

Maximum value M1 is a maximum value of a correction amount in a first period during which the traveling distance of vehicle 10 is from 0 km to D km. Maximum value M2 is a maximum value of a correction amount in a second period during which the traveling distance of vehicle 10 is from D km to 2×D km. Maximum value M3 is a maximum value of a correction amount in a third period during which the traveling distance of vehicle 10 is from 2×D km to 3×D km.

Further, in the correction amount of cylinder 11A, a limit value is set for preventing the correction amount from becoming excessive. Accordingly, in a case where the correction amount exceeds the limit value, the limit value is determined as the maximum value of the correction amount. In the example illustrated in FIG. 3, maximum value M2 of the correction amount in the second period and maximum value M3 of the correction amount in the third period are set to be the limit value.

Figure 4:
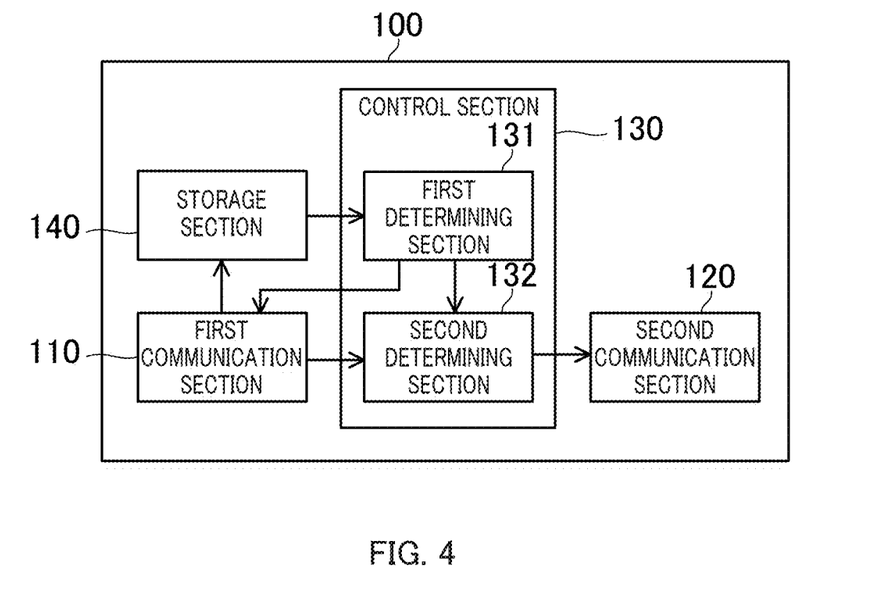
FIG. 4 is a block diagram of a failure determining device.

Next, details of failure determining device 100 will be described. FIG. 4 is a block diagram of failure determining device 100.

As illustrated in FIG. 4, failure determining device 100 includes first communication section 110, second communication section 120, control section 130, and storage section 140.

First communication section 110 receives information on internal combustion engine 11 from vehicle 10, and outputs the received information to control section 130 or storage section 140. The information on internal combustion engine 11 includes the maximum value of the correction amount in each of the periods during which vehicle 10 travels a predetermined distance, and the time-series data described above. The maximum value of the correction amount in each of the periods during which vehicle 10 travels the predetermined distance is output to and stored in storage section 140.

Further, the time-series data are received by first communication section 110, and are output to control section 130 only when there is a request from control section 130. Note that, the time-series data may be stored in storage section 140.

In a case where control section 130 determines that internal combustion engine 11 of vehicle 10 has failed, second communication section 120 notifies information indicating to that effect externally. Specifically, second communication section 120 transmits information to that effect to management base station 30. Second communication section 120 corresponds to the "notification section" of the present disclosure.

Control section 130 includes a central processing unit (CPU), a read only memory (ROM), a random access memory (RAM), and an input/output circuit, all of which are not illustrated. Control section 130 is configured to determine a failure of internal combustion engine 11 of vehicle 10 based on a program set in advance.

Control section 130 includes first determining section 131, and second determining section 132.

First determining section 131 determines whether there is a possibility that internal combustion engine 11 has failed with reference to the maximum values of the correction amounts from storage section 140 and based on the maximum value in each of the periods. First determining section 131 determines that there is the possibility that internal combustion engine 11 has failed, in a case where the maximum value of the correction amount is the limit value in two or more consecutive periods among the periods.

For example, in the example illustrated in FIG. 3, the maximum values of the correction amounts reach the limit value in two consecutive periods as in the second period and the third period. In this case, first determining section 131 determines that there is the possibility that internal combustion engine 11 has failed.

Further, first determining section 131 determines that there is no possibility that internal combustion engine 11 has failed, in a case where there are no consecutive periods during which the maximum values of the correction amounts are the limit value.

In a case where first determining section 131 determines that there is the possibility that internal combustion engine 11 has failed, first determining section 131 controls first communication section 110, and requests first communication section 110 to transmit subsequent time-series data to vehicle 10. First communication section 110 corresponds to the "data acquiring section" of the present disclosure.

The time-series data are the correction amount data and the influencing factor data after determination that there is the possibility that internal combustion engine 11 has failed, which are acquired by first communication section 110. The correction amount data indicate, in time series, the correction amount in the operation correction. The influencing factor data indicate, in time series, the factor influencing the correction amount corresponding to the operation correction.

Second determining section 132 determines whether internal combustion engine 11 has failed, based on the time-series data received by first communication section 110. Specifically, second determining section 132 determines whether internal combustion engine 11 has failed with reference to the correction amount data together with the influence factor data.

The influencing factor data are, as described above, the data relating to the temperature in cylinder 11A, the data relating to the temperature of the fuel, and the data relating to the execution of the regeneration processing for the diesel particulate filter (not illustrated) as an example of a filter provided in the exhaust pipe (not illustrated), and are data that can be the factor influencing the correction amounts of each cylinder 11A.

For example, the point that the correction amounts of each cylinder 11A increase by the execution of the regeneration processing for the diesel particulate filter will be described. The regeneration processing is processing in which soot collected by the diesel particulate filter is burnt, and in which, for example, control of increasing the fuel injection amount of injector 12 or the like is performed. As a result, the fuel injection amount described above is likely to deviate from an amount suitable for correcting a variation in cylinder 11A so that the correction amount may increase.

Further, regarding the point that the correction amounts of each cylinder 11A increase due to the temperature in cylinder 11A, the correction amount may increase in a case where the aforementioned temperature is low since the injected fuel is then less likely to ignite. Further, regarding the point that the correction amounts of each cylinder 11A increase due to the temperature of the fuel, the correction amount may increase in a case where the above-mentioned temperature is low since the viscosity of the fuel then becomes high and a variation is likely to occur in the fuel distributed to each cylinder 11A.

Accordingly, second determining section 132 determines whether internal combustion engine 11 has failed, based on the correction amount remaining after eliminating the correction amount concerning the influence factor data. That is, in a case where the regeneration processing is performed at a timing when the maximum value of the correction amount reaches the limit value, second determining section 132 excludes the timing from the object for failure determination of internal combustion engine 11.

Figure 5:
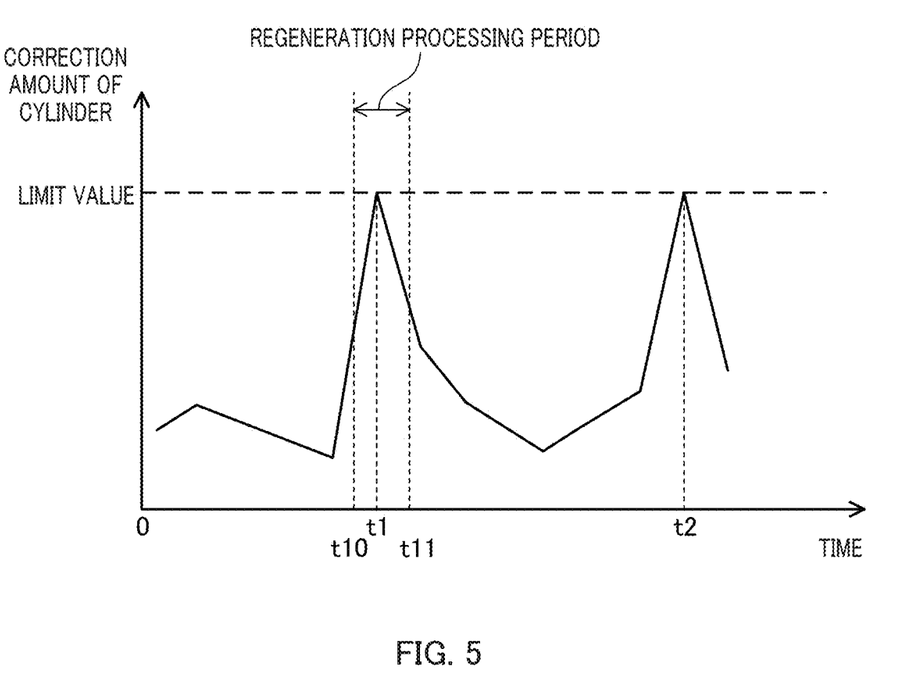
FIG. 5 illustrates a relationship between time and the correction amount of the cylinder.

For example, as illustrated in FIG. 5, a case where the maximum value of the correction amount reaches the limit value at times t1 and t2 after the determination that there is the possibility that internal combustion engine 11 has failed will be described. In this case, when the regeneration processing is performed in a range from time t10 to t11 that is a range including time t1, the part of time t1 is excluded from the object for the determination, and in a case where no other correction amount reaches the limit value in a regeneration processing period including time t1, the period is set to be a period during which the maximum value of the correction amount does not reach the limit value.

Further, when the regeneration processing is not performed at time t2, time t2 is included in the object for the determination, and a period including time t2 is set to be a period during which the maximum value of the correction amount reaches the limit value. In a case where there are consecutive periods as such, second determining section 132 determines that internal combustion engine 11 has failed.

Thus, it is possible to improve accuracy of the failure determination of internal combustion engine 11 by performing the failure determination of internal combustion engine 11 in two stages. Further, since the time-series data are acquired only in a case where first determining section 131 determines that there is the possibility that internal combustion engine 11 has failed, a huge amount of data is not always exchanged. As a result, given the fact that data of many vehicles 10 are exchanged in data collection center 20, it is possible to significantly improve efficiency of the failure determination.

Figure 6:
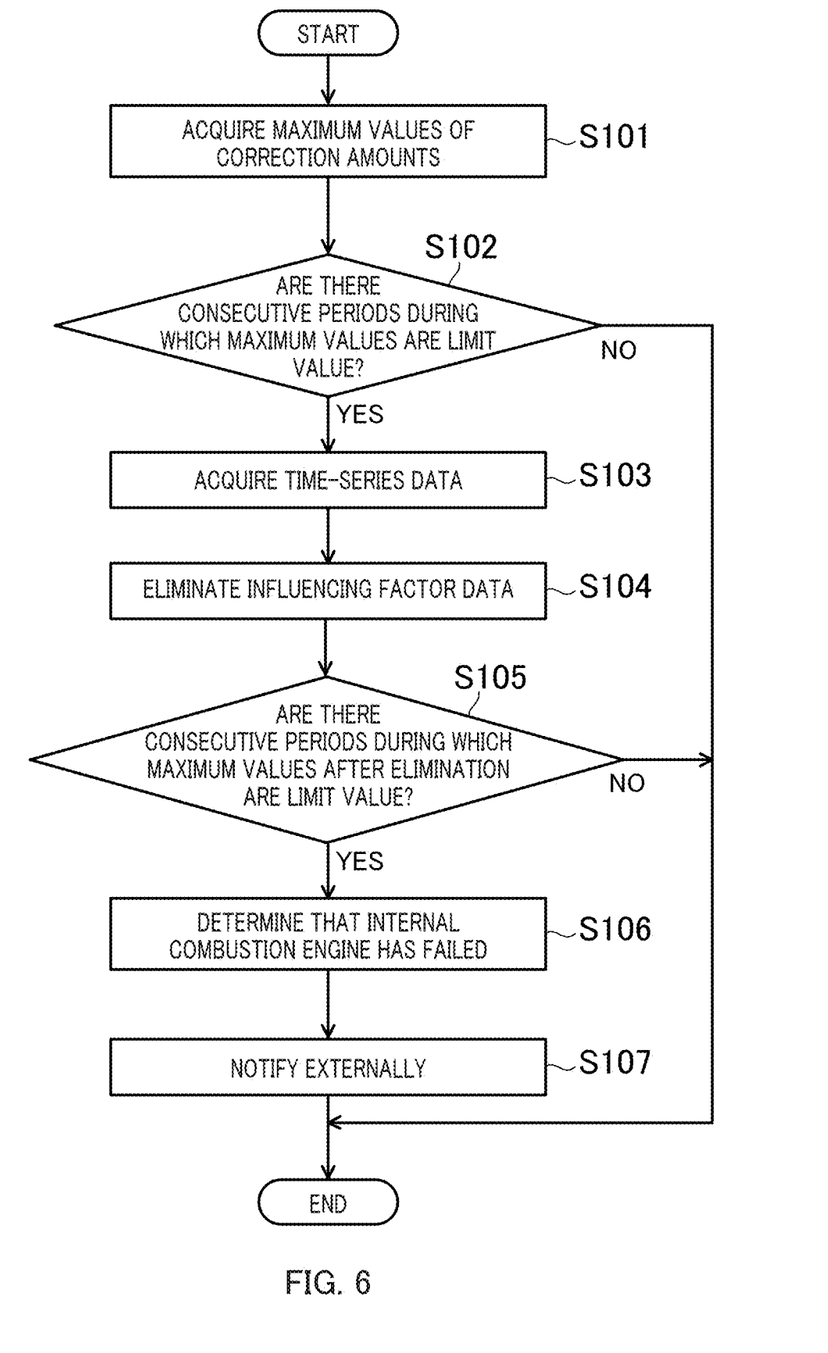
FIG. 6 is a flowchart illustrating an operation example of failure determination control in the failure determining device.

An operation example of failure determination control of failure determining device 100 configured as described above will be described. FIG. 6 is a flowchart illustrating the operation example of the failure determination control in failure determining device 100. The processing in FIG. 6 is appropriately executed for each predetermined time.

As illustrated in FIG. 6, control section 130 acquires the maximum values of the correction amounts stored in storage section 140 (step S101). Control section 130 then determines whether there are consecutive periods during which the maximum values are the limit value (step S102).

As a result of the determination, in a case where there are no consecutive periods during which the maximum values reach the limit value (step S102, NO), the control ends. In a case where there are consecutive periods during which the maximum values are the limit value (step S102, YES), on the other hand, control section 130 requests the time-series data from vehicle 10 via first communication section 110, and acquires the time-series data (step S103).

Next, control section 130 eliminates the influencing factor data from the correction amount based on the time-series data (step S104). Control section 130 then determines whether there are consecutive periods during which the maximum values of the correction amounts after elimination (the maximum values after elimination) are the limit value (step S105).

As a result of the determination, in a case where there are no consecutive periods during which the maximum values after elimination are the limit value (step S105, NO), the control ends. In a case where there are consecutive periods during which the maximum values after elimination are the limit value (step S105, YES), on the other hand, control section 130 determines that internal combustion engine 11 has failed (step S106), and notifies to that effect externally (step S107). Thereafter, the control ends.

According to the present embodiment configured as described above, first determining section 131 and second determining section 132 perform the failure determination of internal combustion engine 11 in two stages. Specifically, first determining section 131 explores the possibility that internal combustion engine 11 has failed, and in a case where there is the possibility that internal combustion engine 11 has failed, second determining section 132 determines the failure of internal combustion engine 11 in detail by using the time-series data. As a result, it is possible to improve the accuracy of the failure determination of internal combustion engine 11 in comparison with a configuration in which the failure determination of the internal engine 11 is performed only by relying on a change in the correction amount.

In particular, second determining section 132 determines whether internal combustion engine 11 has failed after the elimination of the correction amount related to the influence factor data. As a result, since the failure determination of internal combustion engine 11 can be accurately performed, it is possible to prevent components from being replaced wastefully or vehicle 10 from being taken in for repair wastefully.

Further, since the time-series data are acquired only in a case where first determining section 131 determines that there is the possibility that internal combustion engine 11 has failed, a huge amount of data is not always exchanged. When a huge amount of data is always exchanged, communication data increase accordingly, so that the efficiency of the failure determination significantly decreases. Further, since data of many vehicles 10 are exchanged in data collection center 20, the determination efficiency further decreases when a huge amount of data are always exchanged to and from every vehicle 10. In the present embodiment, on the other hand, since a huge amount of data is not always exchanged, it is possible to significantly improve the efficiency of the failure determination.

Note that, although the embodiment described above has exemplified the plurality of cylinders 11A as the portion related to internal combustion engine 11, the present disclosure is not limited thereto, and another portion may also be possible as long as feedback on the state of internal combustion engine 11 can be performed thereby. For example, the foregoing portion may also be a common rail in a common-rail type fuel injection device.

For example, there is a case where a correction amount when a pressure value of a common rail is corrected to a predetermined target value increases due to clogging of an exhaust pipe, malfunction of the fuel, and/or occurrence of gas shortage. In such a case, it is possible to improve the accuracy of the failure determination of internal combustion engine 11 by eliminating influence factor data influencing the correction amount described above.

Further, although the device provided in data collection center 20 is failure determining device 100 in the embodiment described above, the present disclosure is not limited thereto. The device provided in data collection center 20 may also be a failure determination data acquiring device that does not include second determining section 132. In this case, the acquired time-series data may be stored in, for example, storage section 140 (data processing section), and a human who refers to the stored time-series data may determine whether internal combustion engine 11 has failed. Further, the time-series data may be transmitted to another determining device, for example, second communication section 120 (data processing section), and the aforementioned determining device may determine whether internal combustion engine 11 has failed.

Further, in the embodiment described above, first determining section 131 determines that there is the possibility that internal combustion engine 11 has failed, in a case where the maximum value of the correction amount is the limit value in two consecutive periods, but the present disclosure is not limited thereto. For example, first determining section 131 may also determine that there is the possibility that internal combustion engine 11 has failed, in a case where there are three or more consecutive periods during which the maximum values of the correction amounts are the limit value. Further, first determining section 131 may also determine that there is the possibility that internal combustion engine 11 has failed, in a case where the number of periods during which the maximum values of the correction amounts are the limit value is equal to or more than a predetermined number.

Further, although the time-series data after the determination that there is the possibility that internal combustion engine 11 has failed are acquired in the embodiment described above, the present disclosure is not limited thereto. For example, in a case where past time-series data are stored in vehicle 10 or the like, the past time-series data may be acquired.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

INDUSTRIAL APPLICABILITY

The failure determining device of the present disclosure is useful as a failure determining device and a failure determination data acquiring device capable of improving accuracy of failure determination of an internal combustion engine.

The invention claimed is:
1. A failure determining device, comprising:
a first determining section that determines whether there is a possibility that the internal combustion engine has failed with reference to correction amount data indicating, in time series, a correction amount in operation of a portion related to an internal combustion engine;

a data acquiring section that, in a case where it is determined that there is the possibility that the internal combustion engine has failed, acquires influencing factor data indicating a factor influencing the correction amount; and a second determining section that determines whether the internal combustion engine has failed with reference to the correction amount data together with the acquired influencing factor data, wherein the first determining section acquires, in multiple periods, a maximum value of the correction amount data within a period during which a vehicle having the internal combustion engine travels a predetermined distance and determines whether there is the possibility that the internal combustion engine has failed, based on a number of periods during which a maximum value of the correction amount in each of the periods is a limit value for the correction amount.

2. The failure determining device according to claim 1, wherein:

the correction amount is, in a case where operation correction of the portion related to the internal combustion engine is performed a plurality of times, a correction amount in the operation correction in each of periods during which the vehicle travels a predetermined distance.

3. The failure determining device according to claim 2, wherein the data acquiring section acquires correction amount data and influencing factor data after determination that there is the possibility that the internal combustion engine has failed, the correction amount data indicating, in time series, the correction amount in the operation correction, the influencing factor data indicating, in time series, the factor influencing the correction amount in the operation correction.

4. The failure determining device according to claim 3, wherein the second determining section determines whether the internal combustion engine has failed, based on the correction amount remaining after eliminating the correction amount concerning the influence factor data.

5. The failure determining device according to claim 2, wherein the first determining section determines that there is the possibility that the internal combustion engine has failed, in a case where the maximum value of the correction amount is the limit value in two or more consecutive periods among the periods.

6. The failure determining device according to claim 1, wherein the influencing factor data include data relating to execution of regeneration processing for a filter in an exhaust pipe.

7. The failure determining device according to claim 1, comprising a notification section that notifies a determination result by the second determining section externally.

8. The failure determining device according to claim 1, wherein the portion related to the internal combustion engine is a plurality of cylinders provided in the internal combustion engine.

* * * * *

UNITED STATES PATENT AND TRADEMARK OFFICE
CERTIFICATE OF CORRECTION

| | | |
|---|---|---|
| PATENT NO. | : 11,433,913 B2 | Page 1 of 1 |
| APPLICATION NO. | : 17/040364 | |
| DATED | : September 6, 2022 | |
| INVENTOR(S) | : Manabu Iozumi et al. | |

It is certified that error appears in the above-identified patent and that said Letters Patent is hereby corrected as shown below:

On the Title Page

Item (73) Assignee:
"Isuzu Motors Lämskted" should be changed to --Isuzu Motors Limited--

Signed and Sealed this
Ninth Day of May, 2023

*Katherine Kelly Vidal*

Katherine Kelly Vidal
*Director of the United States Patent and Trademark Office*